2,883,317
Patented Apr. 21, 1959

2,883,317

ADDITION PRODUCTS OF α,β-UNSATURATED CARBOXYLIC ACID AND ESTERS WITH HALOALKYL SULFENYL HALIDES

Samuel Allen Heininger and Gail H. Birum, Dayton, Ohio, assignors to Monsanto Chemical Company, a corporation of Delaware No Drawing. Application February 21, 1957
Serial No. 644,435

22 Claims. (Cl. 167—22)

This invention relates to toxic aliphatic acrylic products, and more particularly, to reaction of haloalkanesulfenyl halides with olefinic acids and esters and to certain new compounds obtained by this reaction. The invention further relates to methods for the control of microorganisms and certain novel compositions comprising these acrylic products which are highly toxic to microorganisms.

The literature reports the addition of sulfenyl halides to certain olefinic compounds, but when the olefinic double bond of the addend is adjacent to a negative substituent, there is inhibition of such addition. Thus, Kharasch and Buess, J. Am. Chem. Soc., vol. 71 (1949), page 2726, first column, report that dinitrobenzenesulfenyl chloride would not add to the double bond of acrylonitrile, though this reagent had successfully been added to the double bond of other olefinic hydrocarbons such as styrene. Turner and Connor, J. Am. Chem. Soc. (1947), 69, 1009, similarly report failure to produce addition of 4-chloro-2-nitrobenzenesulfenyl chloride and 4-nitrobenzenesulfenyl chloride to compounds in which the double bond was conjugated with a carbonyl, carbethoxyl or cyano group. Our experiments have confirmed this finding that nitrobenzenesulfenyl halides do not react with acrylonitrile under conditions normally leading to adduct formation when the sulfenyl halide is contacted with other olefins. We have further found it impossible to add perchloromethyl mercaptan, i.e., trichloromethanesulfenyl chloride, to acrylonitrile or to acrylic acid esters, which is in contradiction to the ready addition of this reagent to esters wherein the double bond is further removed from the carboxylic carbon atom, as in allyl acetate (U.S. 2,553,772) and linseed oil (U.S. 2,319,183). It has now been found, however, that the reaction of an acrylic compound with a halogenated aliphatic sulfenyl halide can be successfully accomplished when such sulfenyl halide is incompletely halogenated.

The presently useful acrylic compounds comprise the α,β-olefinic acids and esters thereof of the formula RCH=CRCOOR', where each R represents hydrogen or a hydrocarbon radical free of aliphatic unsaturation and containing from 1 to 6 carbon atoms, provided that at least one R represents H, and R' represents hydrogen or a hydrocarbon radical free of aliphatic unsaturation and containing from 1 to 16 carbon atoms. By aliphatic unsaturation is herein meant carbon-to-carbon olefinic and acetylenic unsaturation. Acrylic acid, where each R of the above formula represents hydrogen, and the alkyl esters thereof are the preferred members of this series for reasons of ready availability and low cost, as well as high reactivity. Examples of presently useful alkyl esters of an acrylic acid are methyl acrylate, ethyl acrylate, n-propyl acrylate, isobutyl acrylate, n-hexyl acrylate, 2-ethylhexyl acrylate, 2-ethyloctyl acrylate, nonyl acrylate, decyl acrylate, tridecyl acrylate, hexadecyl acrylate, etc. Other esters of acrylic acid which undergo the process of the invention are aryl acrylates such as phenyl acrylate, cresyl acrylate (i.e., a crude tolyl acrylate, which may be formed from a mixture of isomeric cresols), benzyl acrylate, cuminyl acrylate, etc., as well as cycloalkyl esters such as cyclohexyl acrylate. Similarly, there may be utilized in the process of the invention β-hydrocarbyl-substituted acrylic acids and esters thereof, such as methyl cinnamate, methyl p-methyl cinnamate, methyl 3-cyclohexylacrylate, methyl 3-naphthaleneacrylate, methyl 3-cyclopentylacrylate, methyl crotonate, p-tolyl crotonate, cycloheptyl cinnamate, etc.

Alternatively to acrylic acid and its esters, there may be employed in the process of the invention α-substituted acrylic acids and their esters. As discussed further hereinbelow, such α-substituted compounds, in reacting with incompletely halogenated alkanesulfenyl halides in accordance with this invention, may result in formation of products differing in some respects from the reaction products of α,β-olefinic acids free of alpha substituents, but such products are also contemplated within the scope of this invention. The preferred α-substituted acrylic acid compounds for use in the process of this invention are methacrylic acid and alkyl esters thereof such as methyl methacrylate, ethyl methacrylate, amyl methacrylate, 2-ethylhexyl methacrylate, decyl methacrylate, undecyl methacrylate, tetradecyl methacrylate, etc. The esterifying alcohol from which the presently useful methacrylate esters are derived may alternatively be an aromatic or alicyclic radical, e.g., there may be used such compounds as phenyl methacrylate, o-tolyl methacrylate, 2,4-xylyl methacrylate, cyclopentyl methacrylate, benzyl methacrylate, etc. Instead of methacrylic acid and its esters, there may be utilized compounds wherein a radical of higher molecular weight than a methyl group is present as a substituent alpha to the carboxylic function of acrylic acid, e.g., methyl 2-methylenebutyrate, methyl 2-methylenecaprate, amyl 2-neopentylacrylate, phenyl 2-methylenebutyrate, m-tolyl 2-methylenebutyrate, methyl 2-phenylacrylate (methyl atropate), etc.

In accordance with this invention, an α,β-unsaturated acid or ester thereof is reacted with an incompletely halogenated alkanesulfenyl halide. The presently preferred class of haloalkanesulfenyl halides which undergo the reaction with α,β-olefinically unsaturated carboxylic acids and esters in accordance with this invention are the halogen-substituted lower alkanesulfenyl halides where the halogen substituents are chlorine or bromine atoms, and wherein at least 1 hydrogen atom is present on the carbon atom attached to the sulfenyl halide radical. Sulfenyl halides are generally prepared by halogenation of symmetrical disulfides. In the case of the aliphatic disulfides, if this halogenation is continued after the formation of the sulfenyl halide from the disulfide, halogen atoms are introduced onto the aliphatic carbon atoms. The presently preferred class of haloalkanesulfenyl halides having at least 1 hydrogen atom present on the carbon atom attached to the sulfenyl halide radical may be prepared by such a halogenation process, wherein disulfides are halogenated with chlorine or bromine to the extent that halogen atoms are introduced onto the aliphatic carbon atoms, said halogenation being discontinued at the point where at least 1 hydrogen atom still remains attached to the carbon atom attached to the sulfenyl halide radical. Exemplary of sulfenyl halides useful in the present process are, e.g., monochloromethanesulfenyl chloride, dichloromethanesulfenyl chloride, dibromomethanesulfenyl bromide, 1-chloroethanesulfenyl chloride, 2-bromoethanesulfenyl chloride, 4-chlorobutanesulfenyl chloride, 1,2-dichlorobutanesulfenyl chloride, 1-chloro-4-bromobutanesulfenyl chloride, 5-chloropentanesulfenyl chloride, trichlorohexanesulfenyl chloride, etc.

When a haloalkanesulfenyl halide as defined above is contacted with one of the presently useful class of olefinic unsaturated carboxylic acid compounds, there is formed a reaction product consisting of compounds containing sulfur atoms and carboxylic radicals. We believe that this reaction proceeds to form an adduct as illustrated by the following equation

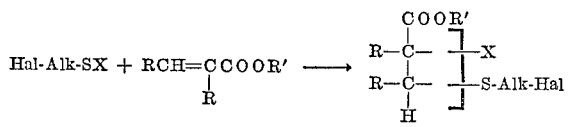

where Hal-Alk-SX represents a presently useful haloalkanesulfenyl halide, and

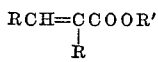

represents an olefinically unsaturated acid or ester as defined hereinabove, and

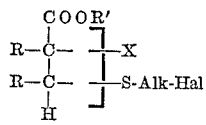

represents an adduct of the sulfenyl halide and the acid or ester wherein the Hal-Alk-S- radical is attached either to the alpha or the beta carbon atom of the carboxylic compound, and the sulfenyl halide halogen X is attached to the alpha or beta carbon atom to which the Hal-Alk-S- radical is not attached. Judging from theoretical considerations, addition of the sulfenyl halide halogen X is expected to occur on the beta carbon atom of the unsaturated compound, especially when a hydrocarbon substituent is present on the alpha carbon atom, but the position of attachment is not known with certainty, and we prefer not to be bound by such speculation. Quite possibly a mixture of α-halo-β-thio and β-halo-α-thio isomers is formed.

The present process is particularly valuable since alkanoic acids and esters thereof similarly substituted by a halogen atom and by a haloalkylthio group do not appear to have been known hitherto. By the present discovery of the addition of haloalkanesulfenyl halides to substituted or unsubstituted acrylic acids and esters, there is afforded an inexpensive and facile synthesis of the haloalkylthio-substituted haloalkanoic acids and esters.

The presently provided adducts may be characterized as 3(2)-halo-2(3)-(haloalkylthio)alkanoic acids and esters, where by this nomenclature is meant a 3-halo-2-(haloalkylthio)alkanoic and/or 2-halo-3-(haloalkylthio)-alkanoic acid or ester. Thus, by the reaction of methyl acrylate with dichloromethanesulfenyl chloride, there is obtained methyl 3(2)-chloro-2(3)-(dichloromethylthio)-propionate.

By the reaction of acrylic acid and acrylate esters in accordance with this invention with haloalkanesulfenyl halides, there are obtained, e.g., propionic acids and alkyl esters such as 3(2)-chloro-2(3)-(chloromethylthio)-propionic acid, methyl 3(2)-chloro-2(3)-(chloromethylthio)propionate, methyl 3(2)-chloro-2(3)-(dichloromethylthio)propionate, ethyl 3(2)-chloro-2(3)-(dichloromethylthio)propionate, isopropyl 3(2)-bromo-2(3)-(dichloro-2(3)-(dichloromethylthio)propionate, phenyl 3(2)-(dichloromethylthio)propionate, nonyl 3(2)-chloro-2(3)-(chloromethylthio)propionate, tridecyl 3(2)-chloro-2(3)-(2-chloroethylthio)propionate, hexadecyl 3(2)-chloro-2(3)-(dichloromethylthio)propionate, methyl 3(2)-chloro-2(3)-(4,4,4-tribromobutylthio)propionate, methyl 3(2)-chloro-2(3)-(1,2,2-trichlorohexylthio)propionate, methyl 3(2)-bromo-2(3)-(1-bromo-2-chloroethylthio)-propionate, etc. The class of presently provided adducts of haloalkanesulfenyl halides with cyclic esters of acrylic acid is exemplified by phenyl 3(2)-chloro-2(3)-(chloromethylthio)propionate, cresyl 3(2)-chloro-2(3)-(dichloromethylthio)propionate, benzyl 3(2)-chloro-2(3)-(dichloromethylthio)propionate, 4-isopropylphenyl 3(2)-chloro-2(3)-(dichloromethylthio)propionate, phenyl 3(2)-chloro-2(3)-(2-chloroethylthio)propionate, phenyl 3(2)-chloro-2(3)-(2,2,2-trichloroethylthio)-propionate, phenyl 3(2)-bromo-2(3)-(2,3,4,4,4-pentabromobutylthio)propionate, etc.

Representative of presently provided adducts of β-hydrocarbylacrylic acids and esters with haloalkanesulfenyl halides are, for example, methyl 3(2)-chloro-2(3)-chloromethylthio)butyrate, ethyl 3(2)-chloro-2(3)-(dichloromethylthio)valerate, methyl 3(2)-chloro-2(3)-(dichloromethylthio)-3-cyclohexylpropionate, etc.

Exemplary of the presently provided compounds derived in accordance with this invention by the reaction of α-hydrocarbyl-substituted acrylic acids and esters of the above formula with the presently useful incompletely halogenated alkanesulfenyl halides are compounds derived from methacrylic acid, and alkyl esters thereof such as 3(2)-chloro-2(3)-(chloromethylthio)-2-methylpropionic acid methyl 3(2)-chloro-2(3)-(dichloromethylthio)-2-methylpropionate, butyl 3(2)-bromo-2(3)-(2-bromoethylthio)-2-methylpropionate, 2-ethylhexyl 3(2)-chloro-2(3)-(trichloroethylthio)-2-methylpropionate, nonyl 3(2)-chloro-2(3)-(chloroamylthio)-2-methylpropionate, hexadecyl 3(2)-chloro-2(3)-(dichloromethylthio)-2-methylpropionate, etc. Another class of the presently provided haloakylthio-substituted haloalkanoic acid compounds are those obtained in accordance with this invention from methacrylic acid esters with alicyclic and aromaitc alcohols, e.g., phenyl 3(2)-chloro-2(3)-dichloromethylthio)-2-methylpropionate, cresyl 3(2)-chloro-2(3)-(chloropropylthio)-2-methylpropionate, cycloheptyl 3(2)-chloro-2(3)-(chloromethylthio)-2-methylpropionate, 2-phenylethyl 3(2)-chloro-2(3)-(tetrachlorobutylthio)-2-methylpropionate, etc. Other compounds which may be prepared by the reaction of this invention include adducts of haloalkanesulfenyl halides with α-hydrocarbyl acrylic acids and esters wherein the α-hydrocarbyl substituent contains more than one carbon atom, e.g., methyl 3(2)-chloro-2-(3)-(dichloromethylthio)-2-ethylpropionate, 2-ethylhexyl 3(2)-chloro-2(3)-(trichloroamylthio)-2-ethylpropionate, 3(2)-bromo-2(3)-(dibromomethylthio)-2-hexylpropionic acid, isobutyl 3(2)-chloro-2(3)-(trichloroethylthio)-2-neopentylpropionate, methyl 3(2)-chloro-2(3)-(dichloromethylthio) - 2 - phenylpropionate, cresyl 3(2)-chloro-2(3)-(1,2-dichloroethylthio)-2-ethylpropionate, etc.

It will be appreciated by those skilled in the art that the presently afforded compounds derived by reaction of a haloalkanesulfenyl halide with an olefinic acid or ester contain an asymmetric carbon atom and may exist in the form of stereoisomers. By the present nomenclature and planar formulas, it is intended to include all such optical isomers of the present compounds, and the racemic mixtures thereof.

The presently provided adducts are susceptible to dehydrohalogenation, and, when exposed to elevated temperatures, may be converted to the corresponding thio-substitutes unsaturated carboxylic acids and esters, particularly when acrylic and β-hydro-carbyl acids and esters are employed in the reaction. In accordance with the present process, there may be produced either the adducts of sulfenyl halides with olefinic carboxylic compounds, or complex reaction mixtures containing such adducts together with unsaturated thio-substituted carboxylic compounds derived therefrom. The unsaturated thio-substituted carboxylic compounds derived from the present adducts can be used as bactericides and fungicides, and may also be employed as monomers for the production of addition polymers useful, e.g., as films, molded articles, etc., and the present adducts are of utility as a source of such monomers.

In carrying out the present process, an α,β-unsaturated carboxylic acid compound of the above formula is simply contacted with one of the presently useful haloalkanesulfenyl halides to form a reaction product consisting of compounds containing sulfur atoms and carboxylic radicals. (By carboxylic radicals are herein meant radicals of the structure

i.e., carboxy radicals, —COOH, and carboxylate ester radicals.) The reaction involves approximately equimolecular amounts of the halogenated alkanesulfenyl halide and of the olefinic carboxylic acid or ester. If desired, an excess of the more readily available component may be present in the reaction mixture to serve, e.g., as a reaction diluent; the reaction appears to consume approximately equimolecular amounts of each reactant and when an excess of either component is used, it generally can be recovered unchanged at the close of the reaction. The rapidity of the reaction varies greatly, depending on the reactants chosen. Exothermic reactions may require cooling and/or diluents to moderate their violence, while other reactant pairs are not completely reacted until after a period of refluxing at elevated temperatures. Suitable inert solvents and diluents which may be employed in the reaction mixture, if desired, include hydrocarbons such as benzene, halogenated solvents such as carbon tetrachloride, oxygenated solvents free of active hydrogen such as ether, etc. A particularly preferred class of solvents are anhydrous organic carboxylic acids, and especially glacial acetic acid, since this solvent also has the advantage of acting as a catalyst for the reaction. Mixtures of carboxylic acid and solvents may also be used as a reaction medium if desired.

The use of catalysts is not necessary, but may be advantageous under some circumstances. Exemplary of catalysts which may be used in the present reaction besides glacial acetic acid as mentioned above are, e.g., Friedel-Crafts catalysts such as boron trifluoride complexes. Pressure variation may also be utilized to facilitate the conduct of the reaction, e.g., by carrying out the reaction in a pressure-resistant vessel under autogenous pressure and at elevated temperatures.

Since the present unsaturated compounds, and particularly acrylic acid and the lower alkyl acrylates, are susceptible to thermal polymerization, the reaction is preferably conducted in the presence of polymerization inhibitors. Examples of suitable polymerization inhibitors are, e.g., hydroquinone, hydroquinone monomethyl ether, methylene blue, copper carbonate, selenium dioxide, tannic acid, etc.

The time required to accomplish the reaction and form the presently afforded products depends on functional factors such as the reactivity of the $\alpha,\beta$-olefinic carboxylic compound and the sulfenyl halide, the temperature of reaction, the presence or absence of catalysts, etc. Reaction rates and times of reaction may vary considerably, depending on details of apparatus or other operational conditions. By modifications in the apparatus, continuous procedures may be substituted for the batch-type operations described below.

An indication of the progress of the reaction is a color change in the reaction mixture; generally sulfenyl halides are a deep red color and the reaction mixture lightens as the sulfenyl halide is consumed. On completion of the reaction, conventional methods such as filtration, decantation and evaporation may be employed to separate the product.

The details of modes of procedure in accordance with this invention are illustrated by the following non-limiting examples:

*Example 1*

This example describes the attempted addition of perchloromethyl mercaptan to methyl acrylate.

To a mixture of 25.8 g. (0.3 mole) of methyl acrylate in 100 ml. of glacial acetic acid was added 55.7 g. (0.3 mole) of perchloromethyl mercaptan. The reaction mixture was heated slowly to 90° C. and then held at 70–90° C. for 6 hours. After cooling overnight, the reaction mixture was distilled, and it was found that the reactants were recovered unchanged; no reaction had occurred.

*Example 2*

When to 16.4 g. (0.19 mole) of methyl acrylate in 100 ml. of glacial acetic acid was added 28 g. (0.185 mole) of dichloromethanesulfenyl chloride, there was an immediate exothermic reaction. The reaction mixture was heated to 60° C. for 1 hour and then let cool to room temperature; it was then reheated to 90–100° C. for 2 hours, after which it was distilled. After removal of the acetic acid, there were collected 23.6 g. of an almost colorless liquid, B. 80–84° C./0.3 mm., $n_D^{25}$ 1.5044, containing 16.33% S, 30.86% C, and 3.73% H. This reaction product contained carboxylic radicals, according to infrared analysis; olefinically unsaturated compounds were present therein. The adduct of methyl acrylate and dichloromethanesulfenyl chloride formed in this reaction is methyl 3(2)-chloro-2(3) - (dichloromethylthio)propionate, i.e., methyl 3-chloro-2 - (dichloromethylthio)propionate and/or methyl 2-chloro-3-(dichloromethylthio) propionate.

By contacting ethyl acrylate with chloropropanesulfenyl chloride in glacial acetic acid and removing the solvent and unreacted starting materials immediately after subsidence of the initial exothermal reaction, there is obtained ethyl 3(2)-chloro-2(3)-(chloropropylthio)propionate.

Similarly, cresyl 3-cyclohexyl acrylate is reacted with dibromomethanesulfenyl bromide to produce cresyl 3(2)-bromo - 2(3) - (dibromomethylthio) - 3 - cyclohexylpropionate.

*Example 3*

To a mixture of 30 g. (0.3 mole) of methyl methacrylate with 100 ml. of glacial acetic acid is added 45.2 g. (0.3 mole) of dichloromethanesulfenyl chloride. After completion of the reaction, the unreacted acetic acid is distilled off under vacuum and then the product is collected by distillation. There is thus obtained in excellent yield, methyl 3(2)-chloro-2(3)-(dichloromethylthio)-2-methylpropionate of the formula

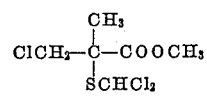

and/or

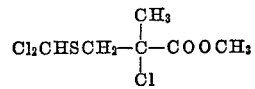

The product of reaction of monochloromethanesulfenyl chloride with nonyl methacrylate under similar conditions is nonyl 3(2)-chloro-2(3)-(chloromethylthio)-2-methylpropionate; and the product of the reaction of atropic acid (2-phenylacrylic acid) with 2-chloroethanesulfenyl chloride is 3(2) - chloro - 2(3) - (2 - chloroethylthio)-2-phenylpropionic acid.

The presently provided adducts and reaction products containing thio-substituted saturated and unsaturated carboxylic compounds have fungicidal and bactericidal properties and are useful as constituents of microbiological toxicant compositions. This utility has been demonstrated by incorporating the reaction product of dichloromethanesulfenyl chloride with methyl acrylate in sterile agar at a concentration of 0.01%, whereby the agar was rendered incapable of supporting the growth of colonies of species of *Micrococcus pyogenes* var. *aureus, Salmonella typhosa,* and *Aspergillus niger* when inoculated therewith.

The present products are also useful as insecticides, nematocides, herbicides, etc. In addition to the direct addition of the present reaction products to a habitat supporting undesirable pest life, they may also be mixed with a carrier such as a finely divided inert powder; incorporated into an organic solvent or diluent; or admixed with surface-active agents, with or without the addition of organic solvents, to prepare toxic compositions which can be diluted with water to form aqueous dispersions or emulsions for application to pest habitats or to pest species. The present reaction products may, for example, be utilized to render organic substrates resistant to microbiological attack, e.g., they may be applied to leather, cloth, etc., or incorporated in paints, lacquers, starch pastes, creams, etc.

The products of this invention are additionally useful as chemical intermediates, e.g., as a source of sulfur-containing olefinic monomers for the preparation of film-forming polymers; as starting materials for preparation of phosphorus compounds, e.g., by reaction with trialkyl phosphites, which phosphorus compounds may be used as biological toxicants and as oil additives, etc. The presently provided acid products, obtained directly or by hydrolysis of the present ester adducts, may, if desired, be converted to the corresponding salts, e.g., sodium, ammonium, or potassium salts, also useful as biological toxicants and for other purposes.

It is also contemplated that the presently provided, sulfur-containing reaction products, of haloalkylthio-substituted haloalkanoic acids and esters produced by reaction of haloalkanesulfenyl halides with olefinic acids and esters may be converted by oxidation (e.g., with hydrogen peroxide in acetic acid, potassium permanganate, chromic acid, etc.) into the corresponding sulfoxides and sulfones.

Other modifications and variations of the present invention will be obvious to those skilled in the art.

What is claimed is:

1. The method which comprises contacting a halogen-substituted alkanesulfenyl halide, where said alkanesulfenyl halide contains up to 6 carbon atoms, the halogen substituents of said halogen-substituted alkanesulfenyl halide are selected from the class consisting of chlorine and bromine, and at least 1 hydrogen atom is present on the carbon atom attached to the sulfenyl halide radical of said alkanesulfenyl halide, with an α,β-olefinically unsaturated carboxylic compound of the formula

RCH=CRCOOR′ where each R is selected from the class consisting of hydrogen and hydrocarbon radicals free of aliphatic unsaturation and containing from 1 to 6 carbon atoms, and at least 1 of the R substituents represents hydrogen, and R′ is selected from the class consisting of hydrogen and hydrocarbon radicals of from 1 to 16 carbon atoms and free of aliphatic unsaturation, and thereby forming an adduct of the formula

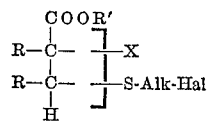

where R and R′ are as defined hereinabove, X represents the halogen of the said sulfenyl halide, and Hal-Alk-S- represents the residue of said sulfenyl halide.

2. The method of claim 1, wherein the reaction of said halogen-substituted alkanesulfenyl halide with said α,β-olefinically unsaturated carboxylic compound is carried out in the presence of glacial acetic acid.

3. The method which comprises contacting a chlorine-substituted alkanesulfenyl chloride wherein said alkanesulfenyl chloride contains up to 6 carbon atoms, and wherein at least 1 hydrogen atom is present on the carbon atom attached to the sulfenyl halide radical of said alkanesulfenyl halide, with an α,β-olefinically unsaturated carboxylic compound of the formula CH₂=CRCOOR′, where R represents a hydrocarbon radical free of aliphatic unsaturation and containing from 1 to 6 carbon atoms, and R′ represents an alkyl hydrocarbon radical of from 1 to 16 carbon atoms, and isolating from the resulting reaction product a haloalkylthio-substituted haloalkanoic compound of the formula

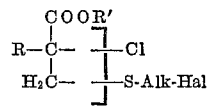

where R and R′ are as defined hereinabove, Hal-Alk-S- represents the chloroalkylthio residue of said alkanesulfenyl halide, and Cl represents the chlorine atom attached to the sulfur atom in said alkanesulfenyl chloride.

4. The method of claim 3, wherein R represents an alkyl radical, and R′ represents an alkyl radical.

5. The method of claim 4, wherein R represents a methyl radical.

6. The method of claim 4, where each of R and R′ represents a methyl radical and said halogen-substituted alkanesulfenyl halide is dichloromethanesulfenyl chloride.

7. The method which comprises contacting a chlorine-substituted alkanesulfenyl chloride wherein said alkanesulfenyl chloride contains up to 6 carbon atoms, and wherein at least 1 hydrogen atom is present on the carbon atom attached to the sulfenyl halide radical of said alkanesulfenyl halide, with an α,β-olefinically unsaturated carboxylic compound of the formula

CH₂=CHCOOR′ where R′ represents a hydrocarbon radical of from 1 to 16 carbon atoms, and thereby forming an adduct of the formula

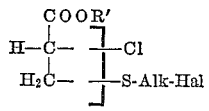

where R′ is as defined hereinabove, Cl represents the chlorine atom attached to the sulfur atom in said alkanesulfenyl chloride, and Hal-Alk-S- represents the chloroalkylthio residue of said alkanesulfenyl chloride.

8. The method of claim 7, wherein said reaction is carried out in the presence of glacial acetic acid.

9. The method of claim 7, wherein R′ represents a saturated aliphatic hydrocarbon radical.

10. The method of claim 7, wherein said halogen-substituted alkanesulfenyl halide is dichloromethanesulfenyl chloride and R′ represents a methyl radical.

11. Haloalkylthio-substituted haloalkanoic acids and esters selected from the class consisting of compounds of the formulas

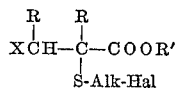

and

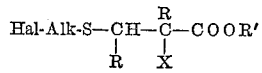

where Hal-Alk represents a lower alkyl radical of from 1 to 6 carbon atoms substituted by halogen atoms selected from the class consisting of chlorine and bromine atoms, and wherein at least 1 hydrogen atom is present on the carbon atom attached to the S atom; X represents a halogen selected from the class consisting of chlorine and bromine; each R represents a hydrocarbon radical free of aliphatic unsaturation and containing from 1 to 6 carbon atoms and at least one R represents hydrogen; and R′ is selected from the class consisting of hydrogen and hydrocarbon radicals free of aliphatic unsaturation and containing from 1 to 16 carbon atoms.

12. A chloroalkylthio-substituted haloalkanoic ester of the formula

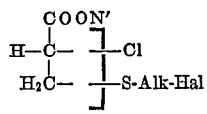

where Hal-Alk represents an alkyl radical of from 1 to 6 carbon atoms substituted by chlorine atoms and wherein at least 1 hydrogen atom is present on the carbon atom attached to the S atom, and R' represents a hydrocarbon radical free of aliphatic unsaturation and containing from 1 to 16 carbon atoms.

13. A dichloromethylthio-substituted chloropropionic ester of the formula

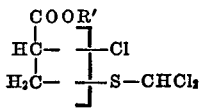

where R' is a saturated alkyl radical of from 1 to 16 carbon atoms.

14. A methyl dichloromethylthio-substituted chloropropionate of the formula

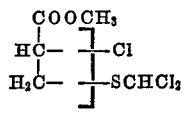

15. A chloroalkylthio-substituted haloalkanoic acid ester of the formula

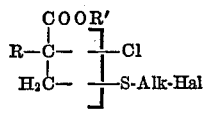

where Hal-Alk represents an alkyl radical of from 1 to 6 carbon atoms substituted by chlorine atoms and wherein at least 1 hydrogen atom is present on the carbon atom attached to the S atom, and R' represents a hydrocarbon radical free of aliphatic unsaturation and containing from 1 to 16 carbon atoms, and R represents a hydrocarbon radical free of aliphatic unsaturation and containing from 1 to 6 carbon atoms.

16. The compound of claim 15, where R is an alkyl radical and R' is an alkyl radical.

17. The compound of claim 15, where R and R' each represent methyl radicals.

18. The compound of claim 17, where Alk-Hal is a dichloromethyl radical.

19. A biological toxicant composition comprising an inert carrier and, as the essential effective ingredient, a pesticidally effective amount of a compound selected from the class consisting of compounds of the formulas

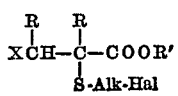

and

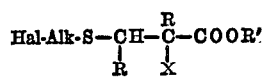

where Hal-Alk represents a lower alkyl radical of from 1 to 6 carbon atoms substituted by halogen atoms selected from the class consisting of chlorine and bromine atoms, and wherein at least 1 hydrogen atom is present on the carbon atom attached to the S atom; X represents a halogen selected from the class consisting of chlorine and bromine; each R represents a hydrocarbon radical free of aliphatic unsaturation and containing from 1 to 6 carbon atoms and at least one R represents hydrogen; and R' is selected from the class consisting of hydrogen and hydrocarbon radicals free of aliphatic unsaturation and containing from 1 to 16 carbon atoms.

20. A biological toxicant composition comprising an inert carrier and, as the essential effective ingredient, a pesticidally effective amount of a methyl dichloromethylthio-substituted chloropropionate of the formula

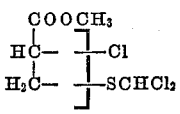

21. The method of inhibiting the growth of undesired microorganisms which comprises exposing said microorganisms to a toxic amount of a compound selected from the class consisting of compounds of the formulas

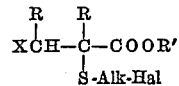

and

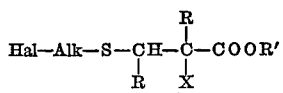

where Hal-Alk represents a lower alkyl radical of from 1 to 6 carbon atoms substituted by halogen atoms selected from the class consisting of chlorine and bromine atoms, and wherein at least 1 hydrogen atom is present on the carbon atom attached to the S atom; X representing a halogen selected from the class consisting of chlorine and bromine; each R represents a hydrocarbon radical free of aliphatic unsaturation and containing from 1 to 6 carbon atoms and at least one R represents hydrogen; and R' is selected from the class consisting of hydrogen and hydrocarbon radicals free of aliphatic unsaturation and containing from 1 to 16 carbon atoms.

22. The method of inhibiting the growth of undesired microorganisms which comprises exposing said microorganisms to a toxic amount of a methyl dichloromethylthio-substituted chloropropionate of the formula

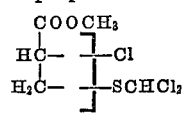

References Cited in the file of this patent

UNITED STATES PATENTS 2,449,992    Gresham et al.            Sept. 28, 1948

OTHER REFERENCES

Fuson et al.: J. Org. Chem., v. 11, p. 470 (1946).
Brintzinger et al.: Berichte, vol. 87, pp. 325–330 (1954).

UNITED STATES PATENT OFFICE
CERTIFICATION OF CORRECTION

Patent No. 2,883,317            April 21, 1959

Samuel Allen Heininger et al.

It is hereby certified that error appears in the above numbered patent requiring correction and that the said Letters Patent should read as corrected below.

Column 3, lines 59 and 60, strike out "(dichloro-2(3)-(dichloromethylthio)propionate, phenyl 3(2)-" and insert instead -- (dichloromethylthio)propionate, isoamyl 3(2)-chloro-2(3)- --; column 4, line 27, for "aromaitc" read -- aromatic --; lines 55 and 56, for "substitutes" read -- substituted --; column 9, line 3, for that portion of the formula reading "COON'" read -- COOR' --.

Signed and sealed this 6th day of June 1961.

(SEAL)
Attest:

ERNEST W. SWIDER            DAVID L. LADD
Attesting Officer            Commissioner of Patents